United States Patent [19]

Takano

[11] Patent Number: 4,780,377
[45] Date of Patent: Oct. 25, 1988

[54] MAGNETO-OPTICAL RECORDING MEDIUM

[75] Inventor: Satoshi Takano, Osaka, Japan

[73] Assignee: Sumitomo Electric Industries, Ltd., Osaka, Japan

[21] Appl. No.: 46,994

[22] Filed: May 5, 1987

[30] Foreign Application Priority Data

May 16, 1986 [JP] Japan ................................ 61-113016

[51] Int. Cl.$^4$ ............................................. G11B 7/24
[52] U.S. Cl. ..................................... 428/694; 428/900
[58] Field of Search ................. 428/694, 900; 365/122; 369/13, 288; 360/131, 134–135

[56] References Cited

U.S. PATENT DOCUMENTS

| | | | |
|---|---|---|---|
| 4,544,443 | 10/1985 | Ohta et al. | 156/643 |
| 4,612,068 | 9/1986 | Tanaka et al. | 420/83 X |
| 4,695,514 | 9/1987 | Takahashi et al. | 428/432 |

FOREIGN PATENT DOCUMENTS

| | | |
|---|---|---|
| 110239 | 6/1982 | Japan . |
| 84358 | 5/1984 | Japan . |
| 34744 | 2/1986 | Japan . |
| 96706 | 5/1986 | Japan . |

OTHER PUBLICATIONS

Gambino et al., "Magneto-Optic Properties of Nd—Fe—Co Amorphous Alloys", J. Appl. Phys., 57(1), Apr. 15, 1985, p. 3906.

Primary Examiner—George F. Lesmes
Assistant Examiner—William M. Atkinson
Attorney, Agent, or Firm—W. G. Fasse; D. H. Kane, Jr.

[57] ABSTRACT

A magneto-optical recording medium in the form of a thin amorphous alloy film having the following composition of Gd-Nd-M-Fe (M: at least one of Dy and Ho), has an axis of easy magnetization in a direction perpendicular to the surface of the film. The M density is at least sufficient to keep the Curie point below 300° C.

1 Claim, 1 Drawing Sheet

MAGNETO-OPTICAL RECORDING MEDIUM

BACKGROUND OF THE INVENTION

1. Field of the Invention

The present invention relates to a magneto-optical recording medium which is applied to a disk memory for a computer, a reloadable optical memory for document filing or the like.

2. Description of the Prior Art

It is known that materials for the aforementioned magneto-optical recording purposes must mainly satisfy in practice the following conditions:

(i) the magnetization should be oriented vertically to a film surface;

(ii) the Curie temperature should be within a range of 100° C. to 200° C.;

(iii) the medium should have a large coercive force; and (iv) the value of $\sqrt{R.\theta k}$ should be large, assuming that R represents a reflection factor and $\theta k$ represents Kerr's angle of rotation.

It is well known that when rare earth elements such as Gd and Tb are added to Fe, the magnetic anisotropic energy is increased to form a vertical magnetic anisotropic film. Thus, a thin film of an amorphous alloy, mainly composed of Tb, Fe and Co has been put into practice as the material for a magneto-optical recording medium. Examples of such thin films are those of GdTbFe, TbFeCo, GdTbFeCo and the like.

These conventional thin amorphous alloy films satisfy all of the aforementioned conditions.

However, Tb, which is an important component of the aforementioned thin amorphous alloy films, is one of the scarcest materials of the rare earth elements. Thus, it is desirable to develop a thin amorphous alloy film not containing any Tb, yet which can serve equally as well as those containing Tb, such as GdTbFe, TbFeCo and GdTbFeCo. Clark numbers of principal rare earth elements are as follows:

Gd: $6 \times 10^{-4}$
Nd: $2.2 \times 10^{-3}$
Sm: $6 \times 10^{-4}$
Dy: $4 \times 10^{-4}$
Ho: $1 \times 10^{-4}$
Tb: $8 \times 10^{-5}$ In the aforementioned point of view, amorphous magneto-optical recording media employing no Tb have been developed in recent years. For example, Gd—Fe satisfies the aforementioned conditions except for the required coercive force, and hence Sm is is added to Gd—Fe to increase the coercive force (Japan Institute of Applied Magnetics, seventh meeting summary p. 193).

However, Gd—Sm—Fe is small in vertical magnetic anisotropy, and an effective recording medium cannot be obtained by the same.

SUMMARY OF THE INVENTION

Accordingly, it is an object of the present invention to provide a magneto-optical recording medium which can satisfy all of the conditions required for a magneto-optical recording material without employing extremely hard to get Tb.

The magneto-optical recording medium according to the present invention is prepared as a thin amorphous alloy film of Gd—Nd—M—Fe, wherein M: is at least one of Dy and Ho, having an axis of easy magnetization in a direction perpendicular to the film surface.

The inventor has discovered that amorphous alloy obtained by adding Nd to GdFe alloy is larger in coercive force than GdFe alloy. Further, the inventor has also discovered that GdNdFe can easily attain a vertical magnetic anisotropic energy higher than that of GdFe, i.e., in excess of $1 \times 10^5$ erg/cm$^3$ dissimilarly to GdSmFe. On the basis of such discoveries, GdNdFe alloy is employed for making a magneto-optical recording medium according to the present invention. However, the Curie point is excessively increased by adding Nd to GdFe. Therefore, at least either Dy or Ho is added in order to suppress such increase in the Curie point, the following relational expressions preferably apply, assuming that X, Y, Z and W represent atomic density levels of Gd, Nd, M and Fe respectively:

$X+Y+Z+W>0.95$ $0.1 \leq X \leq 0.3$ $0.03 \leq Y \leq 0.15$ limit sufficient to keep the Curie point below 300° C., and an upper limit of about 0.15, whereby the Curie point can be established within the range of about 300° C. to about 100° C.

$Z \leq 0.15$

The condition $X+Y+Z+W>0.95$ is possible since magnetic and magneto-optical characteristics of the thin amorphous alloy film are not substantially influenced even if less than 5% of another element is added. It has been found that the oxidation resistance and corrosion resistance are improved by adding a small amount of element Pt, Ti, Al, Cr, Mo or Ta as said other element.

The atomic density of Gd is set within the range of 0.1 to 0.3 in order to suppress medium noise caused by conversion into an amorphous alloy and to maintain residual magnetization particularly at a temperature lower than the Curie point as well as to prevent lowering of Kerr's angle of rotation in reading. If the atomic density of Gd is less than 0.1, the amorphous alloy cannot be easily formed since the residual magnetization is small while the coercive force is also extremely small. When the atomic density of Gd is in excess of 0.3, the coercive force is decreased.

The coercive force of the thin amorphous alloy film is increased in proportion to the atomic density of Nd. However, if the atomic density of Nd is in excess of 0.15, the Curie temperature is excessively increased to deteriorate the recording characteristic. On the other hand, the atomic density of Nd is less than 0.03 the coercive force cannot be effectively increased.

As hereinabove described, the Curie point of the thin amorphous alloy film is increased by addition of Nd. Therefore, Dy and/or Ho is added in amounts sufficient to suppress an excessive increase of the Curie point. The atomic density of Dy and/or Ho must be increased as that of Nd is increased. With respect to Nd having atomic density of 0.15, however, the effect of lowering the Curie point is substantially saturated when the atomic density of Dy or Ho is 0.15. The Curie point is not further lowered even if Dy or Ho in excess of 0.15 is added. Dy or Ho may be selectively independently added, or both of Dy and Ho can be added.

The magneto-optical recording medium according to the present invention will cause no rise in cost due to material shortages since the extremely scarce Tb is not employed. Further, the present magneto-optical recording medium has a Kerr's angle of rotation and coercive force equal to or higher than those of GdTbFe, TbFeCo and GdTbFeCo, which have been generally regarded most practical. Further, the present material does not have any problem in vertical magnetic anisotropic energy, which is an improvement compared to GdSmFe or the like. The magneto-optical recording medium according to the present invention can be sufficiently put into practice since the Curie temperature can be lowered to less than 200° C. as shown in FIG. 3.

DETAILED DESCRIPTION OF A PREFERRED EXAMPLE AND OF THE BEST MODE OF THE INVENTION

Gd, Nd, Dy and Ho chips of 5 mm square were arranged on Fe targets to form films of magneto-optical recording media according to the present invention on glass substrates through general RF double pole sputtering. The respective components were varied in atomic density to prepare various types of thin amorphous alloy films.

Figure 1:
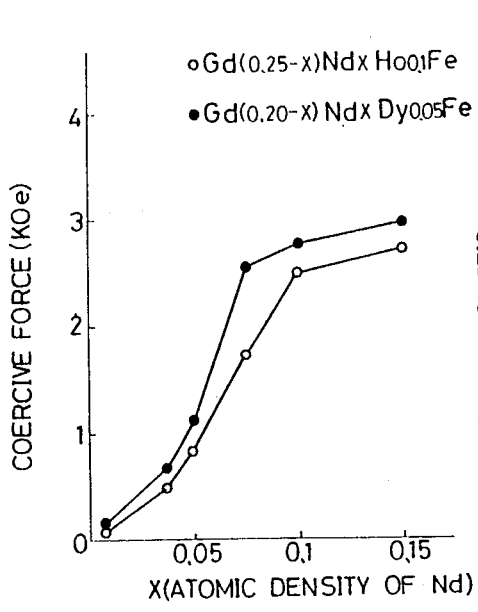
FIG. 1 illustrates the influence exerted by the Nd composition ratio on the coercive force in the magneto-optical recording medium according to the present invention, in which the vertical axis indicates the coercive force and the horizontal axis indicates the atomic density of Nd.
Figure 2:
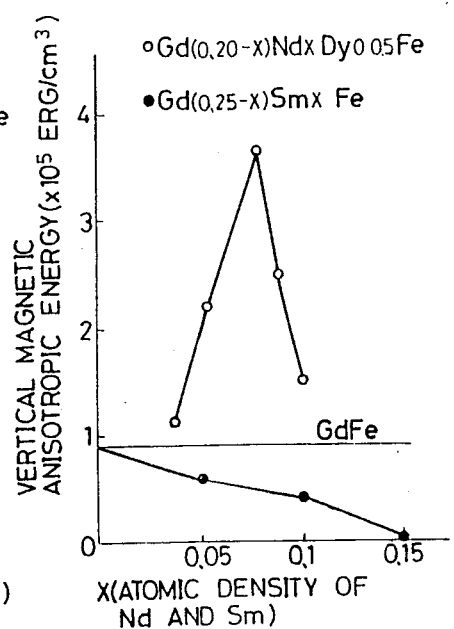
FIG. 2 illustrates the relation between the Nd composition ratio and the vertical magnetic anisotropic energy, in which the vertical axis indicates the vertical magnetic anisotropic energy and the horizontal axis indicates atomic density of Nd and that of Sm.
Figure 3:
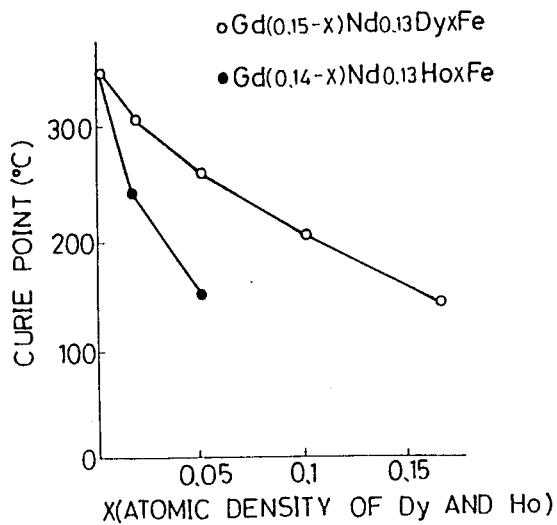
FIG. 3 illustrates the relation between the Dy atomic density of GdNdDyFe and the Curie point and the Ho atomic density of GdNdHoFe and the Curie point, in which the vertical axis indicates the Curie point and the horizontal axis indicates the atomic density levels of Dy and Ho.

The final vacuum was $5 \times 10^{-7}$ Torr and 205 W was inputted with respect to a target size of 130 mm$\phi$. Sputtering gas was prepared by Ar to perform sputtering at a gas pressure of $3.5 \times 10^{-2}$ Torr for 10 minutes. The films were 1800 to 2200 Å thickness. X-ray diffraction showed that all of the films were amorphous. No particular bias voltage was applied. FIGS. 1, 2 and 3 show the results thus obtained.

FIG. 1 shows the influence exerted by the Nd composition ratio on the coercive force. Namely, the coercive force was measured while varying the Nd composition ratio. It is clear from FIG. 1 that the coercive force is increased by adding Nd to GdFe.

FIG. 2 shows the relation between the Nd composition ratio and the vertical magnetic anisotropic energy. For the purpose of comparison, those of Gd—Sm—Fe and GdFe are also shown in FIG. 2.

FIG. 3 shows the relation between Dy atomic density of GdNdDyFe and the Curie point as well as the relation between Ho atomic density of GdNdHoFe and the Curie point.

It is clear from the results as shown in FIGS. 1 to 3 that Gd—Nd—M—Fe has sufficient coercive force and vertical magnetic anisotropic energy for vertical magnetic recording. Although the Curie point is increased when a large amount of Nd is contained, it is clear that the Curie point has been again sufficiently decreased by adding Dy and/or in amounts sufficient for such decrease.

Kerr's angle of rotation $\theta k$ was measured through a semiconductor laser of 820 nm. The results are as follows:

$Gd_{0.21}Fe_{0.79}$: 0.33

$Gd_{0.15}Nd_{0.06}Fe_{0.79}$: 0.35

$Gd_{0.13}Nd_{0.12}Fe_{0.75}$: 0.40

$Gd_{0.13}Nd_{0.10}Ho_{0.02}Fe_{0.75}$: 0.40

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium, comprising a thin amorphous alloy film of Gd—Nd—M—Fe, wherein M is at least one of Dy and Ho, having an axis of easy magnetization in a direction perpendicular to the surface of said film, and wherein X, Y, Z and W represent the atomic density levels of Gd, Nd, M and Fe respectively, wherein the following relational expressions are satisfied $X+Y+Z+W>0.95$ $0.1 \leq X \leq 0.3$ $0.03 \leq Y \leq 0.15$, and wherein the atomic density Z is between a density effective to keep the Curie temperature of the medium below 200 degrees C. and a density of 0.15.

* * * * *